United States Patent
Atohira et al.

(10) Patent No.: US 10,228,686 B2
(45) Date of Patent: Mar. 12, 2019

(54) ROBOT PROGRAMMING DEVICE FOR TEACHING ROBOT PROGRAM

(71) Applicant: FANUC CORPORATION, Yamanashi (JP)

(72) Inventors: Hiroyuki Atohira, Yamanashi (JP); Yoshiharu Nagatsuka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 24 days.

(21) Appl. No.: 15/425,560

(22) Filed: Feb. 6, 2017

(65) Prior Publication Data

US 2017/0235301 A1 Aug. 17, 2017

(30) Foreign Application Priority Data

Feb. 12, 2016 (JP) .................... 2016-025064

(51) Int. Cl.
*G05B 19/42* (2006.01)
*B25J 9/16* (2006.01)

(52) U.S. Cl.
CPC .......... *G05B 19/42* (2013.01); *B25J 9/1664* (2013.01); *G05B 2219/36404* (2013.01); *Y02P 90/265* (2015.11)

(58) Field of Classification Search
CPC .................. B25J 9/1664; G05B 19/42; G05B 2219/36404; Y02P 90/265
See application file for complete search history.

(56) References Cited

U.S. PATENT DOCUMENTS

| 2006/0184275 A1* | 8/2006 | Hosokawa ............. B25J 9/1666 |
| | | 700/245 |
| 2011/0106308 A1 | 5/2011 | Eliasson |
| 2013/0116822 A1* | 5/2013 | Atohira ............. G05B 19/4097 |
| | | 700/255 |
| 2013/0317646 A1 | 11/2013 | Kimoto |
| 2015/0266182 A1 | 9/2015 | Strandberg |

(Continued)

FOREIGN PATENT DOCUMENTS

| CN | 102216037 A | 10/2011 |
| CN | 103419198 A | 12/2013 |
| CN | 104812535 A | 7/2015 |

(Continued)

*Primary Examiner* — Rachid Bendidi
(74) *Attorney, Agent, or Firm* — Hauptman Ham, LLP

(57) ABSTRACT

A robot programming device capable of significantly reducing operation time by an operator required for designating processed portions, and generating a robot program for moving a robot between each processed portion in an appropriate order, without depending on skill or experience of the operator. The programming device is configured to: locate three-dimensional models of a robot and a workpiece in a virtual space; extract shape features from the three-dimensional model of the workpiece; set reference positions of the shape features and the robot; determine a movement order for moving the robot between the shape features based on the reference positions, based on the reference positions of the shape features and the robot; and generate a motion program so that the robot moves the tool along the shape feature and the robot is moved between the shape features according to the determined movement order.

4 Claims, 8 Drawing Sheets

(56) References Cited

U.S. PATENT DOCUMENTS

2015/0268661 A1* 9/2015 Ogawa ............... G05B 19/4097
700/182

FOREIGN PATENT DOCUMENTS

| JP | 2000-190264 A | 7/2000 |
|----|---------------|--------|
| JP | 2006-190228 A | 7/2006 |
| JP | 2007-108916 A | 4/2007 |
| JP | 2008-015683 A | 1/2008 |
| JP | 2011-11263 A | 1/2011 |
| JP | 2013-99815 A | 5/2013 |
| JP | 2013-248677 A | 12/2013 |

* cited by examiner

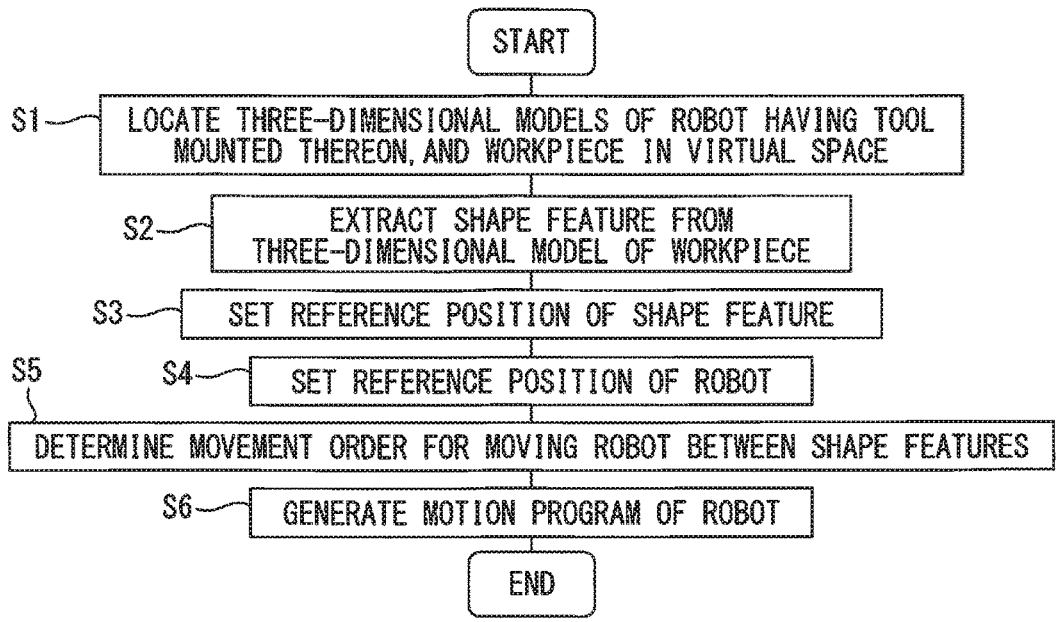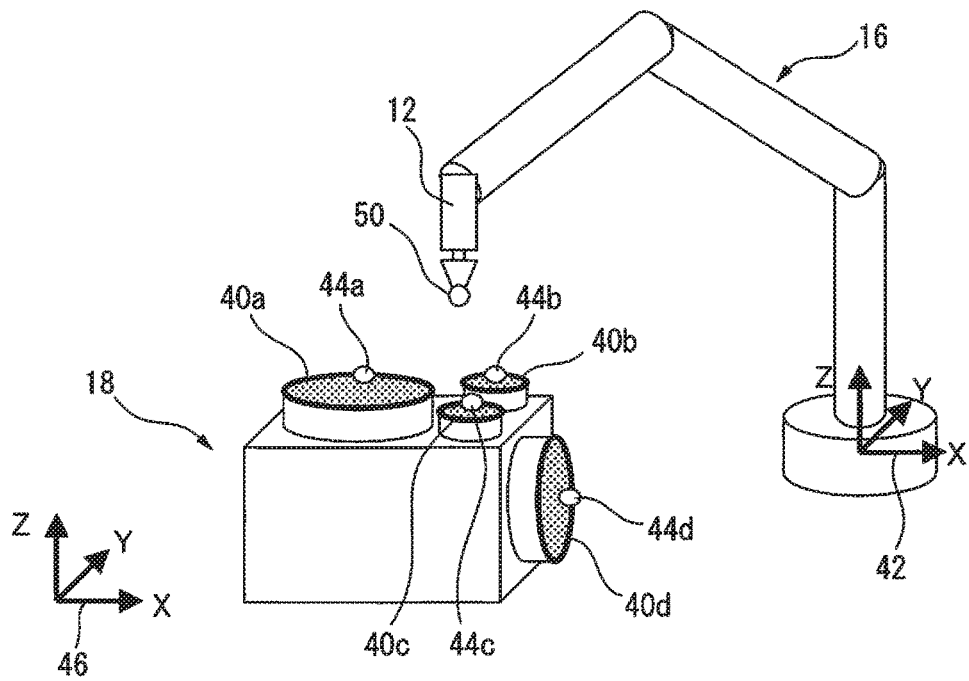

ROBOT PROGRAMMING DEVICE FOR TEACHING ROBOT PROGRAM

RELATED APPLICATIONS

The present application claims priority to Japanese Patent Application No. 2016-025064 filed Feb. 12, 2016, the disclosure of which is hereby incorporated by reference herein in its entirety.

BACKGROUND OF THE INVENTION

1. Field of the Invention

The preset invention relates to a robot programming device for teaching of a motion program of a robot offline.

2. Description of the Related Art

In a device for teaching a robot program offline, when the robot program is taught with respect to processing such as burring or welding, the robot program is generated by designating a processed portion of a CAD model of a workpiece to be processed, in many cases. As a related art document, JP 2000-190264 A discloses a teaching method including: a first step (which does not require a teaching function) and a second step (or an offline-teaching function), in which the offline-teaching by an input of an operator is applied to a welding line, which cannot be taught by the first step, whereby the offline-teaching can be effectively carried out.

JP 2007-108916 A discloses an offline teaching device including: a data obtaining part for obtaining predetermined teaching data of predetermined teaching points from a predetermined processing program regarding a first workpiece; a processing path calculating part for calculating a processing path in the processing program from the teaching data; a model generating part for generating a processing line representing a processed area by using model data of a second workpiece having a geometric feature different from the first workpiece; a teaching point calculating part for calculating the position and posture of each teaching point on the processing line based on a geometric relationship between the processing path and the processing line and data of the position and posture of each predetermined teaching point; and a processing program generating part for generating a processing program regarding the second workpiece by using the processing condition data of each predetermined teaching point and the position and posture of each teaching point.

Further, JP 2008-015683 A discloses a robot programming device including: a workpiece feature obtaining part for obtaining information of a workpiece feature; a holder position obtaining part for obtaining a relative positional relationship between the workpiece and a workpiece holder; a hand position obtaining part for obtaining a relative positional relationship between the workpiece and a hand; a storing part for storing the workpiece feature and the positional relationships as a set of obtained data with respect to a plurality types of workpieces; an obtained data searching part for searching optimum obtained data including the workpiece feature having the highest degree of coincidence with a new workpiece feature, from the stored sets of obtained data; and a program generating part for generating a convey operation program for the new workpiece by using the optimum obtained data.

In the prior art, many techniques have been proposed for generating a robot program by using a three-dimensional feature of a workpiece. In this regard, when the robot program needs to be taught offline with respect to processing such as burring or welding, the robot program is generated by designating a processed portion of a CAD model of the workpiece. In such a case, the designation of the processed portion is manually carried out by an operator, and which takes a lot of operation time in particular when there are many types of workpieces or many processed portions. Further, an operation for teaching a robot program in which a robot is moved between each processed portion in an appropriate order is a cumbersome task which requires trial-and-error and experience and skill of the operator.

SUMMARY OF THE INVENTION

Therefore, an object of the present invention is to provide a robot programming device capable of significantly reducing operation time by an operator required for designating processed portions, and generating a robot program by which a robot can be moved between each processed portion in an appropriate order, without depending on skill or experience of the operator.

According to one aspect of the present invention, there is provided a robot programming device for offline teaching a motion program in which a workpiece is processed by a tool mounted on a robot, the robot programming device comprising: a three-dimensional model locating part configured to locate three-dimensional models of the robot having the tool mounted thereon and a workpiece in a virtual space; a shape feature extracting part configured to extract shape features from the three-dimensional model of the workpiece, the shape features including an outline and/or a surface of a basic shape including a circle and a polygon, or a combined shape constituted by combining a plurality of the basic shapes; a first reference position setting part configured to set shape feature reference positions of the shape features; a second reference position setting part configured to set a robot reference position of the robot; a movement order determining part configured to determine a movement order of the robot in which the robot is moved between the shape features, based on the shape feature reference positions and the robot reference position; and a motion program generating part configured to generate a motion program of the robot so that the robot moves the tool along the shape feature and so that the robot is moved between the shape features according to the movement order.

In a preferred embodiment, the three-dimensional model locating part is configured to locate a three-dimensional model of peripheral equipment in the virtual space, and the robot programming device further comprises: an interference detecting part configured to detect interference between the robot or the tool and the workpiece or the peripheral equipment, at a teaching point in the motion program; a non-interference position searching part configured to search, when the interference detecting part detects the interference, a non-interference position where the robot or the tool does not interfere with the workpiece or the peripheral equipment; and a teaching point position correcting part configured to correct a position of the teaching point based on a searching result by the non-interference position searching part.

BRIEF DESCRIPTION OF THE DRAWINGS

The above and other objects, features and advantages of the present invention will be made more apparent by the following description of the preferred embodiments thereof, with reference to the accompanying drawings, wherein:

FIG. 3 is a flowchart showing an example of a procedure in the robot programming device of FIG. 1;

FIG. 4 shows an example of a state in which a shape feature is extracted from the three-dimensional model of the workpiece and a reference position of the shape feature is set;

DETAILED DESCRIPTIONS

Figure 1:
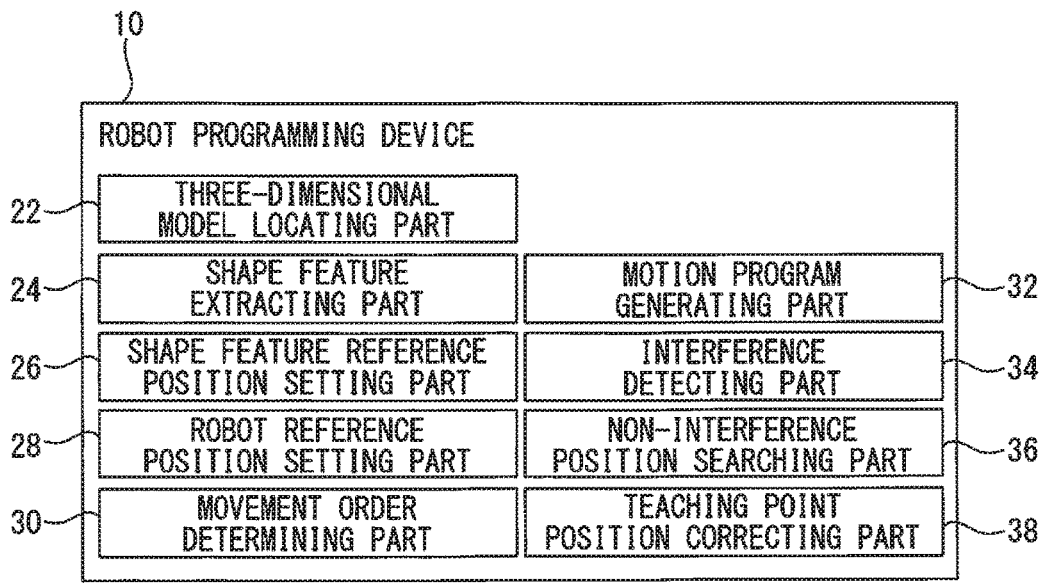
FIG. 1 is a block diagram of a robot programming device according to a preferred embodiment of the present invention.

FIG. 1 is a block diagram of a robot programming device 10 (e.g., a personal computer) according to a preferred embodiment of the present invention. As exemplified in FIG. 2, robot programming device 10 is configured to: locate a three-dimensional model of a robot (e.g., a multi-joint robot having six axes) 16 having a robot arm (or a movable part) 14 on which a tool 12 is mounted, and a three-dimensional model of a workpiece 18, in a virtual space; and teach offline a robot motion program in which robot 16 processes workpiece 18 by tool 12. Robot programming device 10 may have a display 20 for indicating the virtual space.

As shown in FIG. 1, robot programming device 10 includes: a three-dimensional model locating part 22 configured to locate a three-dimensional model of robot 16 having tool 12 mounted thereon and a three-dimensional model of workpiece 18 in the virtual space; a shape feature extracting part 24 configured to extract shape features (as explained below) from the three-dimensional model of workpiece 18, the shape features including an outline and/or a surface of a basic shape including a circle and a polygon, or a combined shape constituted by combining a plurality of the basic shapes; a shape feature reference position setting part (or a first reference position setting part) 26 configured to set shape feature reference positions of the shape features; a robot reference position setting part (or a second reference position setting part) 28 configured to set a robot reference position of robot 16; a movement order determining part 30 configured to determine a movement order of robot 16 in which robot 16 is moved between the shape features, based on the shape feature reference positions and the robot reference position; and a motion program generating part 32 configured to generate a motion program of robot 16 so that robot 16 moves tool 12 along the shape feature and so that robot 16 is moved between the shape features according to the determined movement order.

Three-dimensional model locating part 22 may further locate a three-dimensional model of peripheral equipment (as explained below) other than robot 16 or workpiece 18 in the virtual space. In this case, robot programming device 10 further includes: an interference detecting part 34 configured to detect interference between robot 16 or tool 12 and workpiece 18 or the peripheral equipment, at a teaching point in the motion program; a non-interference position searching part 36 configured to search, when interference detecting part 34 detects the interference, a non-interference position where robot 16 or tool 12 does not interfere with workpiece 18 or the peripheral equipment; and a teaching point position correcting part 38 configured to correct a position of the teaching point based on a searching result by non-interference position searching part 36.

Figure 2:
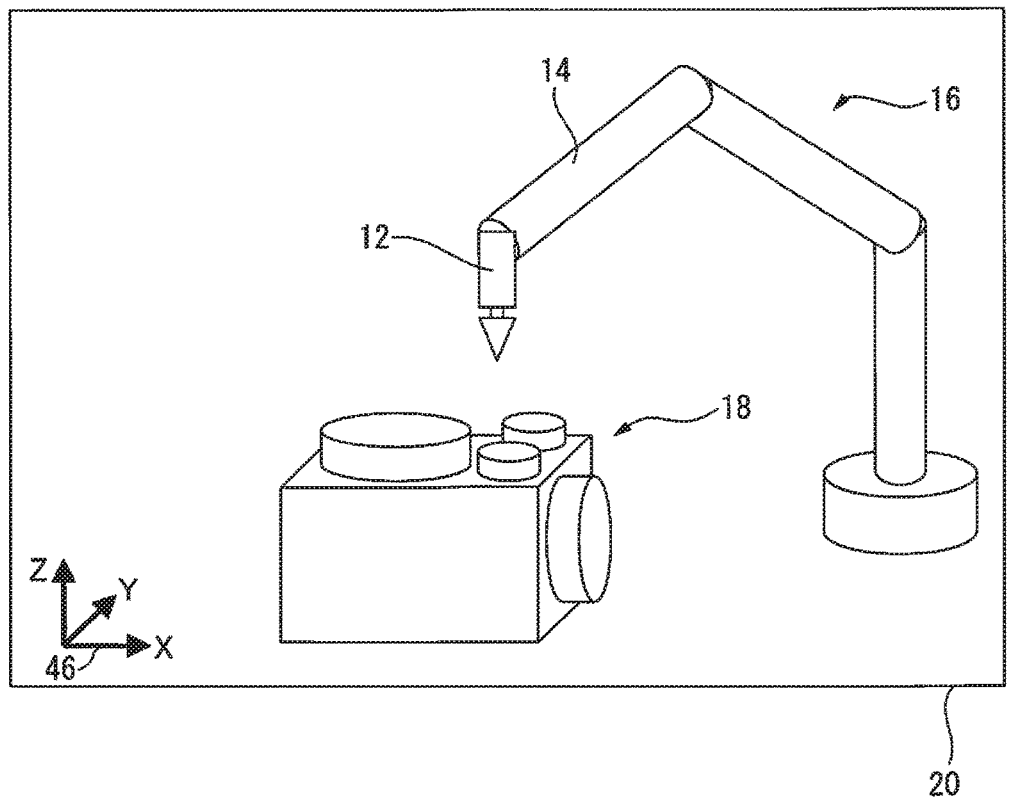
FIG. 2 shows an example of a state in which three-dimensional models of a robot and a workpiece are located in a virtual space.

Hereinafter, a procedure executed by robot programming device 10 will be explained, with reference to a flowchart of FIG. 3. First, in step S1, the three-dimensional models of robot 16 having tool 12 and workpiece 18 are located in the virtual space, as shown in FIG. 2.

Next, as shown in FIG. 4, shape features are extracted from the three-dimensional model of workpiece 18, the shape features including an outline and/or a surface of a basic shape including a circle and a polygon, or a combined shape constituted by combining a plurality of the basic shapes (step S2). For example, by previously identifying color-coded portions (or end surfaces of columns) 40a to 40d of the CAD model of workpiece 18, the portions may be extracted as the shape features. Various conditions may be designated for this identification, for example, a threshold of the length of an extracted outline (or profile) or a threshold of the area of an extracted surface may be designated. Further, when there are two outlines at the inside and outside the shape feature, it may be designated as to which outline should be extracted. Further, a movement direction of the tool along the outline or the surface of the shape feature may be designated.

As shown in FIG. 4, a start point of the motion of robot 16 may be set on each of shape features 40a to 40d. For example, the start point of the motion of the robot may be set on a point (44a to 44d) on the outline of each shape feature, which is the nearest to an origin of the robot (e.g., an origin of a robot coordinate system 42).

Figure 5:
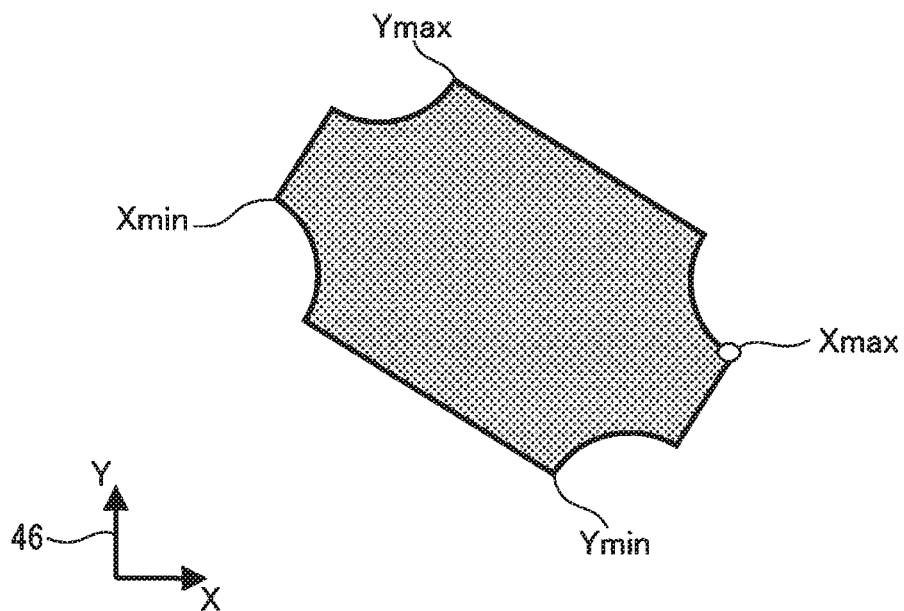
FIG. 5 shows an example in which the shape feature is parallel to an X-Y plane of the virtual space.

Otherwise, the start point of the motion of the robot may be set on a point so that values of X-, Y- and Z-directions of the shape feature with respect to the origin of the virtual space (e.g., the origin of a virtual space coordinate system 46) are maximized or minimized. In this regard, FIG. 5 shows an example in which the shape feature is parallel to the X-Y plane of the virtual space, and the start point of the motion of robot 16 is set on a point (Xmax) of the shape feature having the maximum X-coordinate value.

Figure 6:
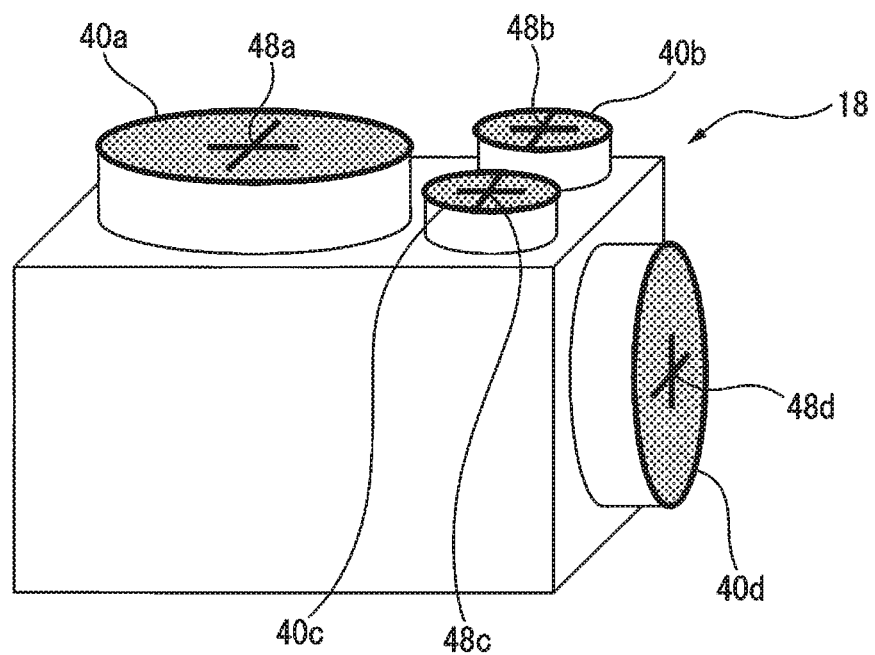
FIG. 6 shows another example of the reference position of the shape feature.

In the next step S3, reference positions of the shape features are set. For example, start points 44a to 44d of the motion of robot 16 as shown in FIG. 4 may be set as the reference positions of the respective shape features. Otherwise, as shown in FIG. 6, center points 48a to 48d of respective shape features 40a to 40d may be set as the reference positions of the shape features.

Figure 7:
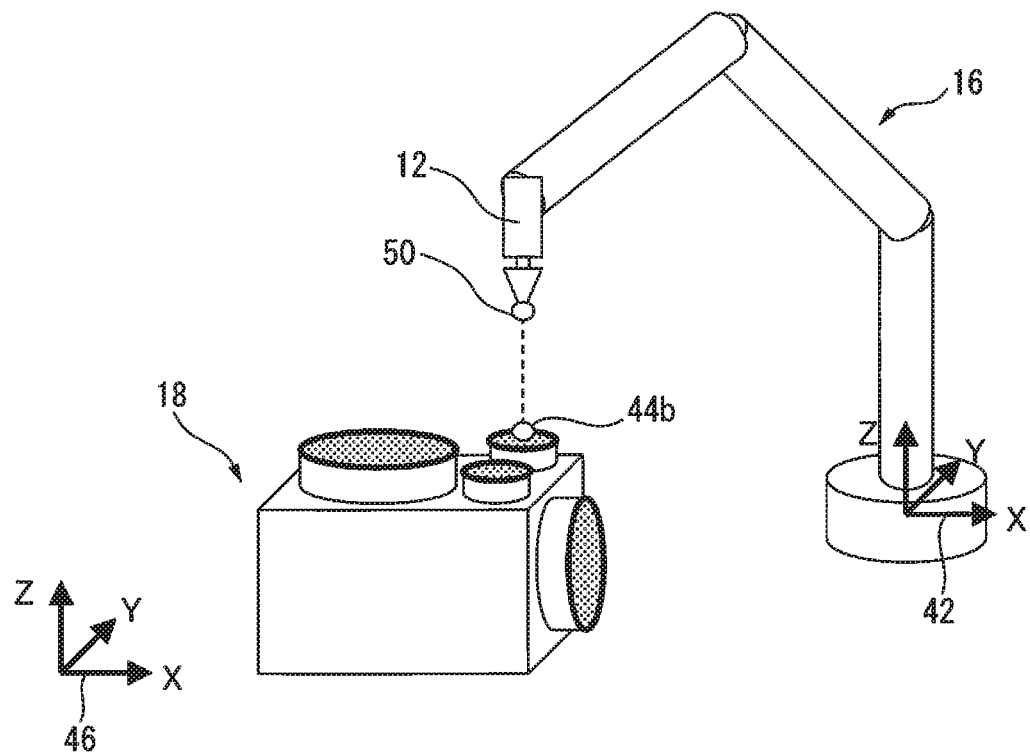
FIG. 7 shows another example of the reference position of the robot.

In the next step S4, a reference position of the robot is set. For example, a current position 50 of a front end of tool 12 (or a tool center point) of robot 16 (see FIG. 4) may be set as the reference position of the robot. Otherwise, as shown in FIG. 7, a position, to which tool center point 50 is vertically and upwardly moved from the start point of the robot motion which is the nearest to the robot origin (in the illustrated embodiment, start point 44b), may be set as the reference position of the robot.

In the next step S5, based on the reference positions of the shape features and the reference position of the robot, a movement order, in which (tool 12 of) robot 16 is moved between the shape features, is determined. As exemplified in FIG. 8, as a method for determining the movement order in which robot 16 is moved between shape features 40a to 40d, a solution for a traveling salesman problem may be used, as explained below.

Figure 9:
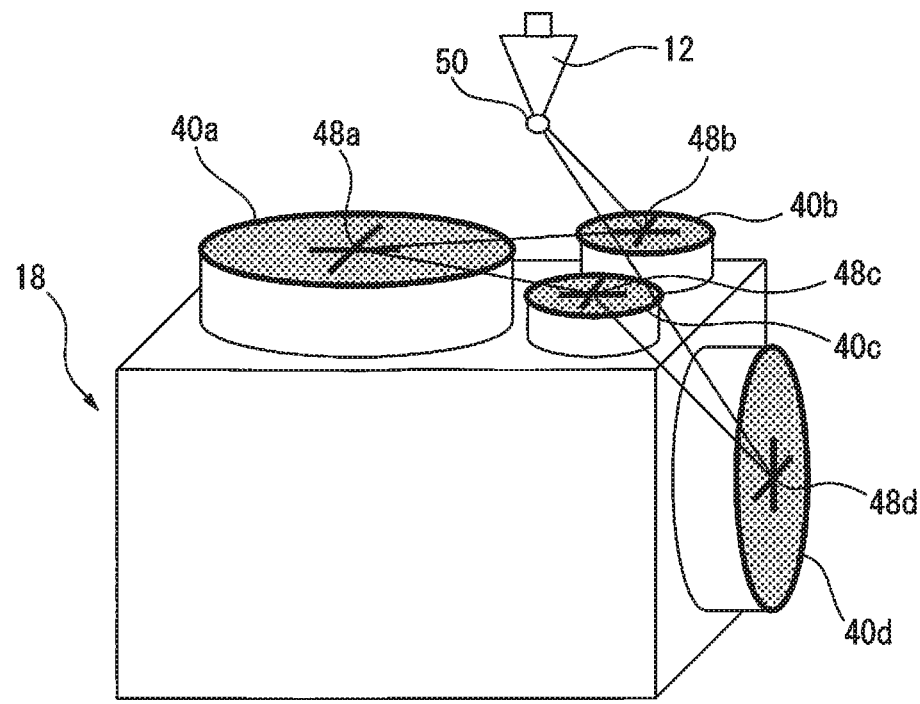
FIG. 9 shows another example of the movement order of the robot.

First, a movement path of robot 16, which starts from the reference position of the robot, sequentially passes through reference positions 48a to 48d of shape features 40a to 40d, and returns to the reference position of the robot, is randomly selected. Then, the length of the movement path is calculated and is determined as a tentative minimum distance. Next, as shown in FIG. 9, another movement path of robot 16, which starts from the reference position of the robot, sequentially passes through reference positions 48a to 48d of shape features 40a to 40d, and returns to the reference position of the robot, is randomly selected. Then, the length of another movement path is shorter than the above tentatively determined minimum distance, the length of another movement path is updated as a new minimum distance. By repeating such processes by a predetermined number of times (or by calculating the lengths of all movement paths), an optimum movement path having the minimum distance can be obtained. For example, when the path as shown in FIG. 9 has the minimum distance, the movement order for moving the robot between each shape feature is (48b→48a→48c→48d), or vice versa.

Figure 8:
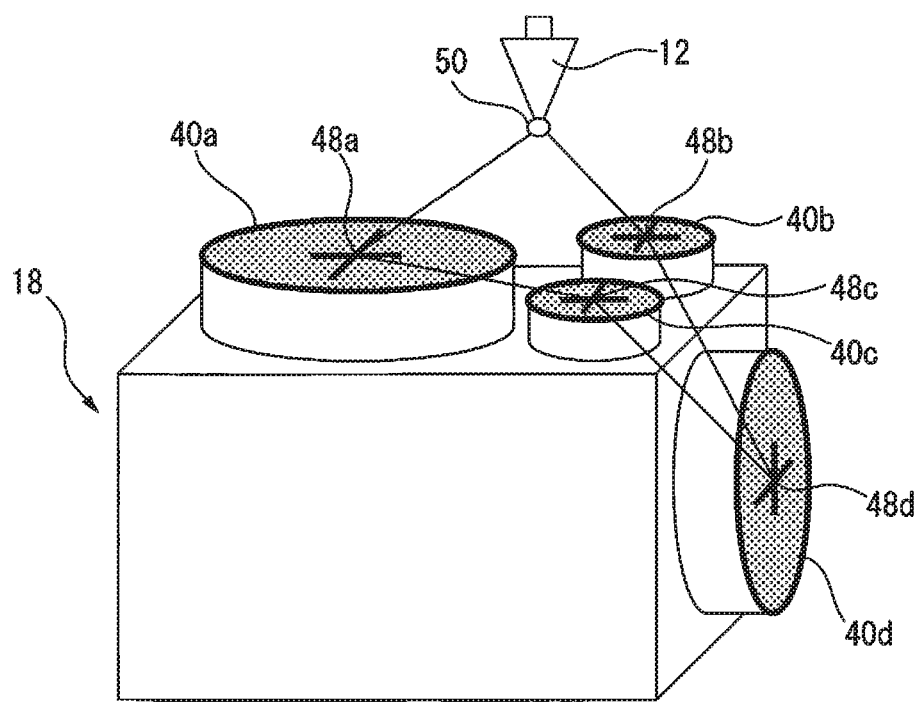
FIG. 8 shows an example of a movement order of the robot.

Other than the method for determining the shortest path as shown in FIGS. 8 and 9, various methods can be used. Also, another solution for a traveling salesman problem may be used so as to determine the movement order along which the robot is moved between each shape feature.

In the next step S6, a motion program of robot 16 is generated so that robot 16 moves tool 12 along shape features 40a to 40d, and tool 12 is moved between shape features 40a to 40d according to the movement order determined in step S5. Concretely, a motion type, a velocity, a position and a posture of a teaching point generated from shape features 40a to 40d are designated. Then, based on the designated motion type, the designated velocity, the designated position and the designated posture, the motion program of robot 16 is generated so that robot 16 moves tool 12 along shape features 40a to 40d, and robot 16 is moved between shape features 40a to 40d according to the determined movement order.

Figure 10:
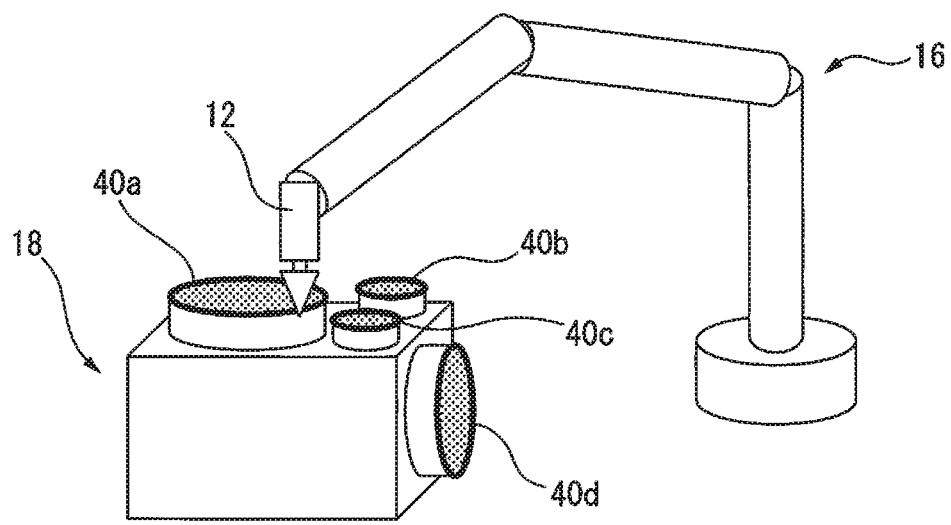
FIG. 10 shows an example in which a tool of the robot is moved along the shape feature of the workpiece.
Figure 11:
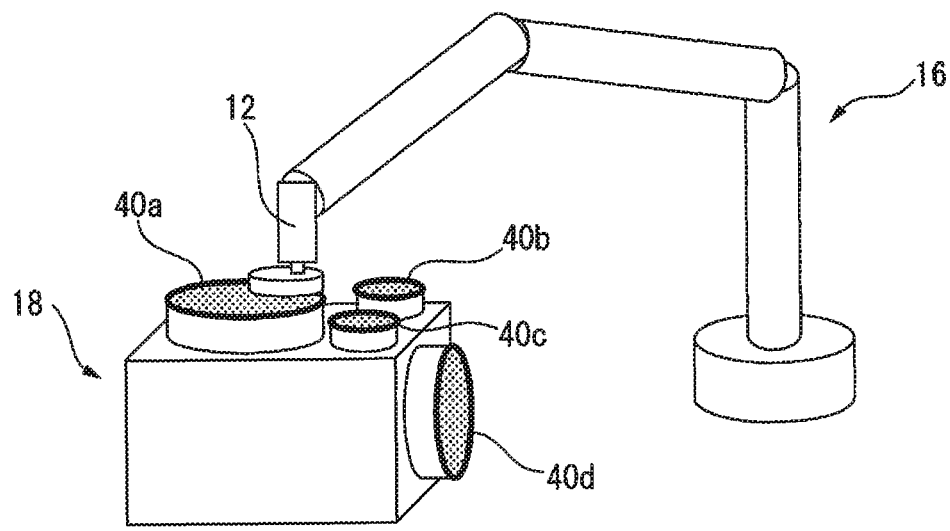
FIG. 11 shows another example in which a tool of the robot is moved along the shape feature of the workpiece.

As an example of the movement of tool 12 along shape features 40a to 40d, a front point of tool 12 may trace the outline of each of shape features 40a to 40d, as shown in FIG. 10. As another example, when tool 12 has a disc-shaped abrasive member, tool 12 may be moved so that the abrasive member of tool 12 polishes the surface of each shape feature 40a to 40d, as shown in FIG. 11.

As explained above, in the present disclosure, the series of procedure (i.e., extracting the plurality of shape features of the CAD model of the workpiece; setting the reference positions of the shape features and the reference position of the robot; determining the appropriate movement order for moving the robot between the shape features; and generating the motion program so that the tool is moved along the shape features and the robot is moved according to the determined order) can be automatically carried out. Therefore, when a robot program regarding processing such as burring or welding is to be taught, it is not necessary that the operator manually designates a portion to be processed on the CAD model of the workpiece, whereby the operation time can be significantly reduced. Further, the robot program for moving the robot between the portions in the appropriate order can be obtained without depending on experience or skill of the operator.

Figure 12:
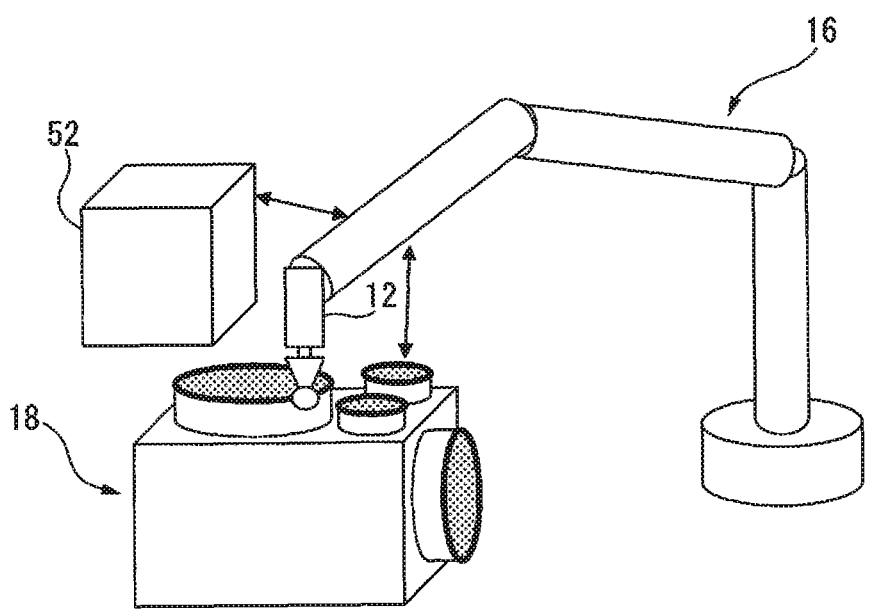
FIG. 12 shows an example of a state in which a three-dimensional model of peripheral equipment is further located in a virtual space.

FIG. 12 shows an example in which a three-dimensional model of peripheral equipment 52 is located in the virtual space, in addition to the three-dimensional models of robot 16 and workpiece 18. By locating peripheral equipment 52 in the virtual space, interference between peripheral equipment 52 and robot 16 (tool 12) when robot 16 is moved to each teaching point in the motion program of robot can be checked, in addition to interference between robot 16 (tool 12) and workpiece 18.

Figure 13:
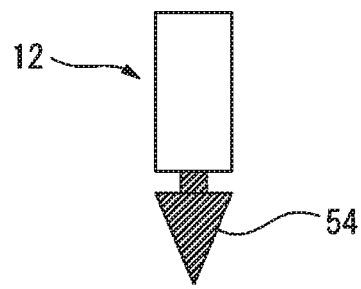
FIG. 13 shows an example in which a processing portion of the tool is excluded from interference objects to be detected.
Figure 14:
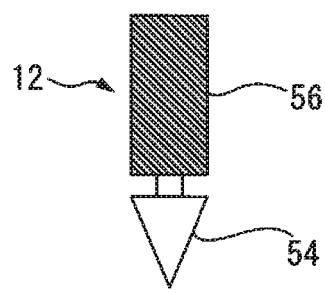
FIG. 14 shows an example in which a non-processing portion of the tool is added to the interference objects to be detected.

In this regard, as shown in FIG. 13, a tool processing portion 54 of tool 12 (indicated by a hatching in FIG. 13), which may directly contact or come close to workpiece 18, may be designated so as to exclude tool processing portion 54 from detection objects regarding interference between tool 12 and workpiece 18 or peripheral equipment 52. By virtue of this, interference between tool processing portion 54 and workpiece 18 or peripheral equipment 52 is not detected. Otherwise, as shown in FIG. 14, a tool non-processing portion 56 of tool 12 (indicated by a hatching in FIG. 14), other than tool processing portion 54, may be designated as the detection object for checking interference. Also in this case, interference between tool processing portion 54 and workpiece 18 or peripheral equipment 52 is not detected.

Figure 15:
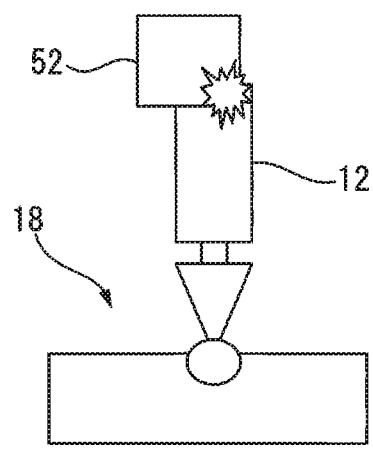
FIG. 15 shows an example in which interference between the tool and the peripheral equipment is detected at a teaching point of a robot program.

FIG. 15 shows an example in which interference between tool 12 and peripheral equipment 52 is detected at a certain teaching point in the motion program. In such a case, due to translational movement of the tool center point and/or rotational movement of the robot about the tool center point, a position for avoiding the interference can be searched.

Figure 16:
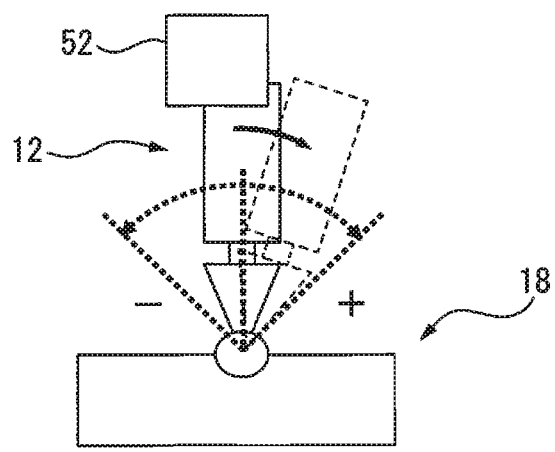
FIG. 16 shows an example in which the interference is avoided by rotational movement about a tool center point.
Figure 17:
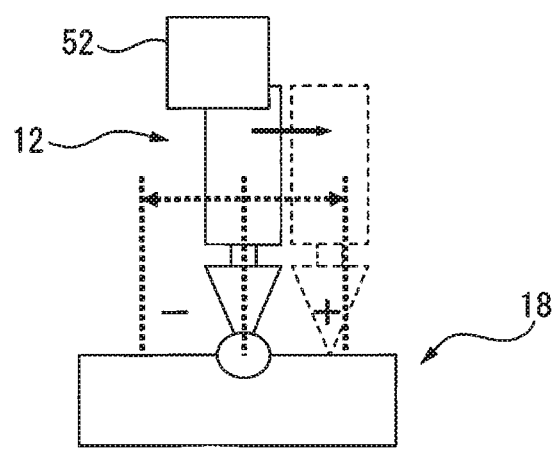
FIG. 17 shows an example in which the interference is avoided by translational movement of the tool center point.

As a concrete example, FIG. 16 shows that, about a position where interference between robot 16 (tool 12) and peripheral equipment 52 is detected, rotational movement (w, p, r) of the robot is carried out within a predetermined search range (or angular range), so as to search a position where robot 16 (tool 12) does not interfere with peripheral equipment 52. On the other hand, FIG. 17 shows an example in which, with respect to a position where interference between robot 16 (tool 12) and peripheral equipment 52 is detected, translational movement (x, y, z) of the tool center point is carried out within a predetermined search range, so as to search a position where robot 16 (tool 12) does not interfere with peripheral equipment 52.

In this regard, in the translational or rotational movement for searching the position where the robot does not interfere with the workpiece or the peripheral equipment, a search range of each direction may be designated. Further, in the translational or rotational movement for searching the position where the robot does not interfere with the workpiece or the peripheral equipment, validity/invalidity of searching in each direction can be set or switched (for example, searching in the X- and Y-directions is valid, and searching in the Z-direction is invalid). In addition, in the translational or rotational movement for searching the position where the robot does not interfere with the workpiece or the peripheral equipment, a searching order of the directions can be set or changed.

After a search result regarding a position (or a non-interference position) where the robot does not interfere with the workpiece or the peripheral equipment is obtained, the position of the teaching point is corrected. In one method capable of being designated as a method for correcting the position of the teaching point based on the search result of the non-interference position, the position where the robot does not interfere with the workpiece or the peripheral equipment is sequentially searched based on validity/invalidity of the searching and the searching order, the firstly searched position is determined as a search result in which the robot does not interfere with the workpiece or the peripheral equipment, and then the position of the teaching point is corrected based on the search result. In this case, searching of the other non-interference position in each direction after the firstly searched position may be omitted.

Otherwise, in another method capable of being designated as a method for correcting the position of the teaching point based on the search result of the non-interference position, the positions where the robot does not interfere with the workpiece or the peripheral equipment are searched based on validity/invalidity of the searching and the searching order, all of the searched non-interference position are compared to respective positions where the interference occurs, a non-interference position in which a difference between the non-interference position and the position where the interference occurs is the smallest is determined as a search result of the non-interference position, and then the position of the teaching point is corrected based on the search result. In this case, the non-interference position is searched with respect to all directions which are set as valid and designated by the searching order.

In the example as shown in FIG. 16 or 17, a program in which the robot or the tool does not interfere with the workpiece or the peripheral equipment can be automatically generated, and thus operation time required for confirming the program and/or correcting the teaching point, etc., can be significantly reduced.

In the above embodiment, the robot programming device is explained as a personal computer. However, the present invention is not limited as such, for example, the robot programming device may be another device having the equivalent function. Otherwise, the function of the robot programming device may be incorporated as a processor, etc., in a robot controller for controlling the actual robot.

According to the present disclosure, when a robot program regarding a processing such as burring or welding needs to be taught, operation time required for manually designating processed portions on a CAD model of a workpiece by an operator can be significantly reduced. Further, a robot program by which a robot can be moved between each processed portion in an appropriate order can be obtained, without depending on skill or experience of the operator.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A robot programming device for offline teaching a motion program in which a workpiece is processed by a tool mounted on a robot, the robot programming device comprising:
   a three-dimensional model locating part configured to locate three-dimensional models of the robot having the tool mounted thereon and the workpiece in a virtual space;
   a shape feature extracting part configured to extract shape features from the three-dimensional model of the workpiece, the shape features including at least one of (i) an outline or (ii) a surface of a basic shape including a circle and a polygon, or a combined shape constituted by combining a plurality of the basic shapes;
   a first reference position setting part configured to automatically set shape feature reference positions of the shape features;
   a second reference position setting part configured to automatically set a robot reference position of the robot;
   a movement order determining part configured to determine a movement order of the robot in which the robot is moved between the shape features, based on the shape feature reference positions and the robot reference position; and
   a motion program generating part configured to generate the motion program of the robot so that the robot moves the tool along the shape features and so that the robot is moved between the shape features according to the movement order.

2. The robot programming device as set forth in claim 1, wherein
   the three-dimensional model locating part is configured to locate a three-dimensional model of peripheral equipment in the virtual space, and
   the robot programming device further comprises:
      an interference detecting part configured to detect interference between the robot or the tool and the workpiece or the peripheral equipment, at a teaching point in the motion program;
      a non-interference position searching part configured to search, when the interference detecting part detects the interference, a non-interference position where the robot or the tool does not interfere with the workpiece or the peripheral equipment; and
      a teaching point position correcting part configured to correct a position of the teaching point based on a searching result by the non-interference position searching part.

3. The robot programming device as set forth in claim 1, wherein the second reference position setting part is configured to set a start point of a motion of the robot on an outline of each of the shape features, the start point being the nearest to an origin of the robot.

4. The robot programming device as set forth in claim 1, wherein the second reference position setting part is configured to set a start point of a motion of the robot to cause values of X-, Y- and Z-directions of the shape features with respect to an origin of the virtual space to be maximized or minimized.

* * * * *